Figure 1:
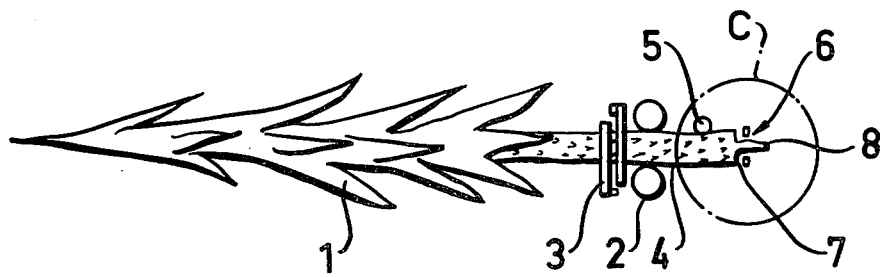

United States Patent [19]

Hedin

[11] Patent Number: 4,476,755

[45] Date of Patent: Oct. 16, 1984

[54] DEVICE AT AUTOMATIC MARKING OF CONTINUOUSLY ADVANCED TREE STEMS

[75] Inventor: Jan Erik Hedin, Alfta, Sweden

[73] Assignee: OSA AB, Alfta, Sweden

[21] Appl. No.: 446,872

[22] Filed: Dec. 6, 1982

[30] Foreign Application Priority Data

Dec. 17, 1981 [SE] Sweden .............................. 8107590

[51] Int. Cl.$^3$ ........................... B27B 1/00; B27B 7/02
[52] U.S. Cl. ....................................... 83/364; 83/365; 83/367; 83/369
[58] Field of Search ................. 83/364, 365, 367, 369; 144/2 Z, 2 AA, 3 D, 356, 357, 379

[56] References Cited

U.S. PATENT DOCUMENTS

| 1,959,851 | 5/1934 | Biggert, Jr. | 83/289 |
| 3,477,327 | 11/1969 | Aizawa | 83/364 X |
| 3,720,247 | 3/1973 | Lindblom | 144/3 D |
| 4,148,344 | 4/1979 | Critchell | 144/357 X |
| 4,250,935 | 2/1981 | Helgesson | 144/2 AA |

Primary Examiner—James M. Meister

Attorney, Agent, or Firm—Cushman, Darby & Cushman

[57] ABSTRACT

The invention relates to a device for preventing length measuring errors resulting from accidentally remaining local offshoots from a portion of the butt end of a tree stem which is continuously advanced toward a cross-cutting member for cutting the stem in predetermined length sections. A stem-measuring device periodically emits a cutting impulse to the cross-cutting member so that the advancing stem will be cut into predetermined lengths. Two detectors are provided in a spaced relationship for sensing the entering of the butt end into a detecting station and then emitting an actuating signal to start the measuring device. The spacing of the two detectors, which are symmetrically positioned with respect to the centerline of the stem path, does not exceed a predetermined minimum butt diameter. The measuring device is not actuated until signals from both detectors are emitted. Thus, sensing of a local offshoot from the butt end by only one of the detectors does not start the measuring device with the result that the offshoot does not cause a shorter-than-desired length of stem.

5 Claims, 3 Drawing Figures

DEVICE AT AUTOMATIC MARKING OF CONTINUOUSLY ADVANCED TREE STEMS

This invention relates to a device at the automatic marking for the cross-cutting of stems, which are advanced continuously with their butt end first, by means of a measuring instrument scanning continuously the length of the stem, for example a measuring wheel rolling along the stem, for periodically emitting a cross-cut impulse to a cross-cutting member to actuate the same when cross-cutting is to be executed, for which purpose a stationary detector is provided to scan the entering butt end and then to emit a signal for starting the measuring function of the measuring instrument.

The background of the known arrangement described above is as follows.

In the highly mechanized forestry of to-day, in addition to conventional processors now some type of a mobile logging machine, called harvester, is used to a large extent, which fells, draws in, limbs and marks the tree for cross-cutting, and which sorts the logs to heaps of timber and, respectively, pulp wood. The machine is operated by only one man, which has an ample equipment of automatic devices for length determination and continuous scanning of the stem diameter at his disposal. The speed of advancement of the tree during the limbing moment can be higher than 2 m per second, which corresponds to 2 cm per a hundredth part of a second. In spite of this high advancing speed, it is at present required that the tolerance of the timmer length is limited to between 0 and 5 cm over programmed nominal log length. Every cross cut during the marking is carried with a saw cut substantially perpendicular to the centre line of the stem. Hereby the start and stop for the measuring wheel rolling along the stem and emitting measuring impulses are accurately controlled.

The start situation of the measuring equipment at the beginning of the butt log, however, is different, because the felling cut at the stump often takes place at an oblique angle, due to buttress, root swells etc. The irregularities of the stem at the butt cut, besides, are not suitable for the impulse-emitting measuring wheel to start therefrom. It was tried previously to solve this problem by using a photocell, which faces toward the stem and switches in the measuring function when the butt end of the tree breaks the beam to the photocell. The impulse-emitting measuring wheel in that case must be positioned farther inward on the stem and be started from an impulse number corresponding to the distance between the photocell and measuring wheel. This method in normal cases is satisfactory in respect of an acceptably correct state for the measuring operation, even when the instructions prescribe at an obliquely cross-cut end surface to start the measuring from the centre of the surface.

At the rapid felling process performed by the machine type in question, ho-ever, the tree can be felled before the felling cut has been carried out completely. In many cases a relatively narrow fibre strip with a length of up to 2-3 dm is torn off from the periphery of the stump and follows along with the tree. When then the butt end of the tree at the processing passes the photocell, it easily can happen that the fibre strip passes in such a position that it breaks the beam path for the photocell acting as detector and thereby causes the photocell to act too early in relation to the proper butt end. As a result thereof, the measuring equipment is misled and determines the length of the first log too short, counted from the real butt end.

The aforesaid drawback, which can imply considerable rejects of perfect timber material, is eliminated in that at the device according to the invention an additional detector is provided to the side of the first one in transverse direction of the stem, which together cover a total width, which at maximum amounts to the minimum butt diameter for saw timber, which device is capable to start its measuring function first when signals from both of the detectors occur, in order to safeguard against outside local offshoots from the butt end.

Figure 2:
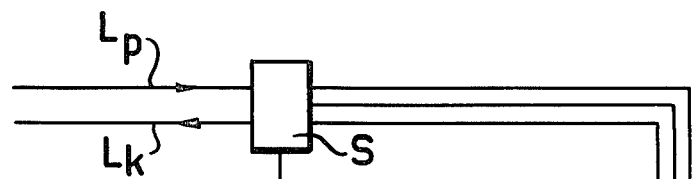
Figure 3:
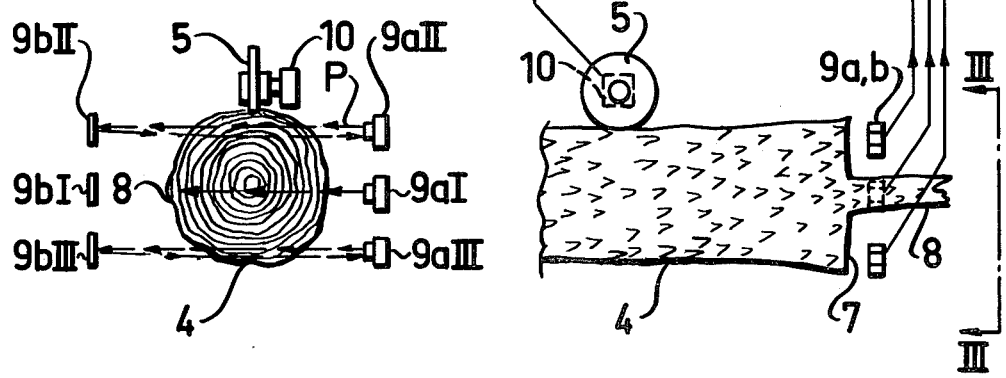

An embodiment of the device according to the invention is described in the following, with reference to the accompanying drawing, in which FIG. 1 is a schematic view of a tree being processed, where the device according to the invention is comprised in the measuring equipment, FIG. 2 shows on an enlarged scale the detail circumscribed in FIG. 1 by the dash-dotted circle C with associated electric basic diagram, and FIG. 3 is an end view of the detail in FIG. 2 senn from the line II—II in said Figure.

FIG. 1 shows a felled tree 1 advanced between feed rolls 2 while being limbed by limbing tools 3. Against the stem 4 a measuring wheel 5 rolls in the usual way, which wheel is located fixed in relation to a stationary detecting device designated generally by 6. The butt end of the stem is designated by 7, and from this butt end projects a tip 8, which was torn off from the stump at the felling of the tree. The details circumscribed by a dash-dotted circle C are shown on an enlarged scale in FIG. 2.

The detecting device according to the invention appears most clearly from FIG. 3. At the embodiment shown, three detectors of photocell type with closed circuit current are mounted to the side of each other, i.e. signal is released at the braking of the photocell ray. Every detector is here shown to comprise a combined light source/photocell $9a$ and a reflector (mirror) $9b$ with respective special designations I-III, which are located each on one side of the path of the stem 4. The ray paths are indicated by arrows P. The distance bridged over by the two outer detectors $9aII$–$bII$ and $9aIII$–$bIII$ amounts at maximum to the expected minimum diameter of the butt end for timber. An impulse transmitter 10 coupled to the measuring wheel 5 is connected via a line $L_m$ (FIG. 2) to a control unit S, which also receives output signals of the detectors (photocells) via separate lines $L_d$. The control unit also has an input for a line $L_p$ from an operating table (not shown) and an output for a line $L_k$ to a cross-cutting device (not shown).

The mode of operation briefly is as follows for the marking of timber which is started by impressing some of the timber programming buttons. When at the advancement of the stem 4 the tip 8 of the butt end enters the ray path of, for example, the central detector $9aI$–$bI$ (as shown in the Figures) and thereby breaks the ray path, a start signal for the measuring function of the continuously rolling measuring wheel 5 (i.e. emittance of measuring impulses) in the control unit S is emitted via the corresponding line $L_d$. This single start signal, however, is too weak, i.e. below a threshold value preset in the control unit, for starting the measuring function. When, however, during the continued advancement of the stem also the ray path for any one of the remaining detectors is broken, this time by the butt end 7 proper, a second start signal is emitted, which together with the first start signal exceeds said threshold value and thereby starts the measuring function. The measuring wheel, the counting rate of which had been preset in the control unit on its distance from the detecting device, now emits through its impulse transmitter 10 the residual measuring impulses, which are required for obtaining the stepping to the cross-cutting impulse corresponding to the desired log length. This impulse then actuates the cross-cutting device via the line $L_k$, so that the correct log length is obtained in spite of the projecting tip 8. Safeguard is obtained also against a start of the measuring function in such cases when a knot, bark chip or dirt on a photocell or reflector temporarily precedes the butt end.

By using three detectors $9a,b$ it is apparently ensured that double start signals always are obtained, even when the butt end 7 owing to a curved stem or a forced oblique feed is laterally offset. Even at a minimum diameter of the butt end, the end will cover, in addition to the central detector, one or the other of the outer detectors.

Another aspect of the invention is connected to the fact that, due to the lack of fibre raw material, even pulp wood trees with a very small diameter are processed, the butt cut diameter of which is not capable to cover more than a single detector. For this purpose, the feed rolls 2 can be provided with a device (which alternatively may be a separate device), which automatically scans when the diameter is smaller than a preset minimum diameter, so that only one detector is required to be actuated for obtaining start signal. (For these pulp wood trees with small diameter, namely, the requirement of accurate measurement is not as high as for the valuable saw timber of greater diameter). The processing of pulp wood trees can then be programmed via a special button, whereby a condition is switched in, which implies that only one of several photocells must be actuated for emitting a signal for starting length determination.

The invention, of course, is not restricted to the embodiment described above. It may, for example, be possible that only two strategically positioned detectors are sufficient instead of the three detectors shown. Even more than three detectors can be imagined. As an alternative to the photocell units shown to operate with reflectors, it can be imagined to use the more traditional arrangement with light source and photocell each on one side of the stem path. The photocell detector also can be replaced by a detector operating with ultrasound, laser, hydraulic, pneumatic or mechanic scanning elements. Even other modifications are imaginable within the scope of the invention, by replacing certain components by other ones having an equivalent or similar function. The arrangement of starting the measuring function first by the second detector signal can be varied in many differeent ways. A simple alternative to the described addition of the signals proper is to cause the signals to act so that they each close one of two contacts connected in series in a live actuation circuit for the measuring function. This method should also simplify the adjustment to the cross-cutting of pulp wood, because then only that contact is closed in advance which corresponds to the outer detector or outer detectors. A purely electronic alternative to the contacts connected in series is an AND-gate.

What I claim is:

1. A device for preventing/length measuring errors resulting from accidentally remaining local offshoots from a portion of the butt end of a tree stem continuously advanced, with the butt end first, towards periodically actuated cross-cutting member for cutting the stem in predetermined length sections, a measuring instrument positioned downstream of said member and including a measuring wheel being arranged to roll along the stem and continuously register the stem length to periodically emit a cutting impulse to said cross-cutting member for actuating the same when said length section has been passed through, a stationary detector, acting horizontally in the transverse direction of the stem path, being provided downstream of said cross-cutting member to sense the entering of the butt end and then to emit an actuating signal to the starting means for said measuring instrument, characterized in that a second stationary detector is positioned in a spaced relation to the first stationary detector for acting in parallel therewith, the positions of the first and second detectors being symmetrical with respect to the center line of the stem path, and their spacing not exceeding a predetermined minimum butt diameter for a stem classified as saw timber, the first and second detectors being associated to said starting means for the measuring instrument such that signals from both detectors are required to actuate said starting means.

2. A device as defined in claim 1, characterized in that a third stationary detector is positioned in a spaced relation to the first detector on the side thereof opposite to the second detector and acting in parallel therewith, the spacing between the third and the first detectors not exceeding said minimum butt diameter, and the first detector being positioned substantially on the centerline of the stem path, whereby always at least two detectors will sense the butt end even in case of a laterally offset position of the butt end due to curvature of the stem or an oblique feed thereof.

3. A device as defined in claim 1, characterized in that every detector comprises a light source and a photocell located each on one side of the stem path.

4. A device as defined in claim 1, characterized in that every detector comprises a combined light source/photocell and a reflector positioned on opposite sides of the stem path.

5. In apparatus for sequentially cutting a tree stem into predetermined lengths: advancing means for axially advancing a tree stem, butt-end first, past a cross-cutting device; measuring means operable when activated, by direct contact with the tree stem, to measure the extent of stem advancement and to emit a cutting signal to the cutting device to actuate the same each time a predetermined length of tree stem, as measured by said measuring means, has passed said cross-cutting device; and a detector system responsive to the arrival of the butt end of the tree stem at the detector system for emitting a signal to activate the measuring device in order to initiate measurement of the first stem length, said detector system including means for preventing the first length of the stem, beginning with the butt end, from being cut too short as a result of an erroneous activating signal to the measuring means being emitted by te detector system because of the presence of a longitudinal offshoot projecting from the butt end of the stem, said means comprising at least two detectors which are activated by the presence of the butt end, said detectors being spaced apart in a direction transverse to the axis of the tree stem a distance not exceeding a predetermined minimum butt end diameter and said detector system including means associate with said two detectors for emitting said signal to activate the measuring device only when both detectors are activated.

* * * * *